(12) United States Patent
Sghedoni et al.

(10) Patent No.: US 8,517,157 B2
(45) Date of Patent: Aug. 27, 2013

(54) CRAWLER VEHICLE DRIVE CONTROL SYSTEM

(75) Inventors: Lorenzo Sghedoni, Modena (IT); Franco Pertusi, Modena (IT)

(73) Assignee: CNH America, LLC, New Holland, PA (US)

( * ) Notice: Subject to any disclaimer, the term of this patent is extended or adjusted under 35 U.S.C. 154(b) by 0 days.

(21) Appl. No.: 13/463,930

(22) Filed: May 4, 2012

(65) Prior Publication Data

US 2013/0111889 A1 May 9, 2013

Related U.S. Application Data

(62) Division of application No. 12/242,379, filed on Sep. 30, 2008, now Pat. No. 8,196,727.

(30) Foreign Application Priority Data

Oct. 5, 2007 (EP) .................................... 07425623

(51) Int. Cl.
*B62D 11/08* (2006.01)
*B62D 11/00* (2006.01)

(52) U.S. Cl.
USPC ......................................... 192/85.63; 180/6.7

(58) Field of Classification Search
None
See application file for complete search history.

(56) References Cited

U.S. PATENT DOCUMENTS

| 3,398,819 | A | 8/1968 | Ruhl et al. |
| 3,620,319 | A | 11/1971 | Armasow et al. |
| 6,199,441 | B1 * | 3/2001 | Kanenobu et al. ......... 192/85.63 |
| 6,527,070 | B2 * | 3/2003 | Ryan ............................... 180/6.7 |
| 2007/0137967 | A1 | 6/2007 | Ishida et al. |

* cited by examiner

*Primary Examiner* — Rodney Bonck
(74) *Attorney, Agent, or Firm* — Patrick M. Sheldrake

(57) ABSTRACT

A drive control system of a crawler vehicle has a lever, a hydraulic distributor for feeding pressurized oil over a feed line to a hydraulic actuator. The hydraulic actuator can engage and release a central clutch. A cable has a first end fixed to a rod of the hydraulic actuator, and a second end connected to the hydraulic distributor. The cable activates and deactivates the hydraulic distributor, depending on the position of the rod. A main pulley is integral with the lever about which the cable is wound.

2 Claims, 3 Drawing Sheets

CRAWLER VEHICLE DRIVE CONTROL SYSTEM

This divisional application claims priority under 35 U.S.C. §120 from U.S. patent application Ser. No. 12/242,379 filed on Sep. 30, 2008 now U.S. Pat. No. 8,196,727 by Lorenzo Sghedoni with the same title, which claims priority to the benefit of European Patent Application 07.425.623.1 filed on Oct. 5, 2007, the full disclosures of which are both hereby incorporated by reference.

The present invention relates to a crawler vehicle drive control system, in particular for a farm tractor.

Crawler vehicles commonly have two steering clutches; two brakes; and a central clutch between the engine and transmission. At each track drive sprocket, a device is installed substantially comprising a steering clutch and a brake. To make a wide turn, only the steering clutch of one track is released; whereas, to make a tight turn, the brake corresponding to the turn direction of the vehicle is also activated.

At present, crawler vehicle controls are all manually operated. More specifically, the steering clutches are controlled by levers or by one lever in models manufactured by the present Applicant.

Crawler vehicles normally comprise other levers for controlling the parking brake, accelerator, transmission, and on-vehicle or trailing-type implement actuators.

A major drawback of crawler vehicles of the above type is the large number of manual controls, some of which are operated simultaneously, resulting in considerable physical fatigue of the operator due to maneuvering involved and the effort required to operate the controls.

SUMMARY OF THE INVENTION

An improved drive control system may be applied to particular advantage, though not exclusively, to farm tractors, to which the following description refers purely by way of example.

Simplified lever control of the steering clutches, track brakes, and central clutch can be achieved by a drive control system having a lever pivoting about a cam-equipped hinge fixed to a frame of the vehicle. A hydraulic system is activated by said lever as of an initial position. The hydraulic system supplies pressurized oil over a feed line to a hydraulic actuator. The hydraulic actuator engages and releases a central clutch. A feedback arrangement then restores said hydraulic means to said initial position.

A one lever system can provide for controlled-position controlling of both steering clutches, brakes, and central clutch. As soon as it is disengaged from a first position, the lever can be moved automatically into another position to release the central clutch.

Similarly, if released by the operator in any position between a range of positions, the lever could be moved automatically into a set position while, if the operator holds the lever firmly in any position within a range, the position is operator-controlled as required to "skate" and permit intricate maneuvering of the vehicle.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Rear portion 10 (indicated schematically as a whole but only partly shown) is connected to an engine ENG that is connected mechanically to a transmission device TD by a drive shaft SH1. The connection of engine ENG to transmission device TD also comprises a central clutch CC for connecting/disconnecting drive shaft SH1.

Two shafts SH2, SH3 extend from transmission device TD to rotate two drive sprockets MW1, MW2.

Each drive sprocket MW1, MW2 is associated with a respective track (not shown).

Figure 1:
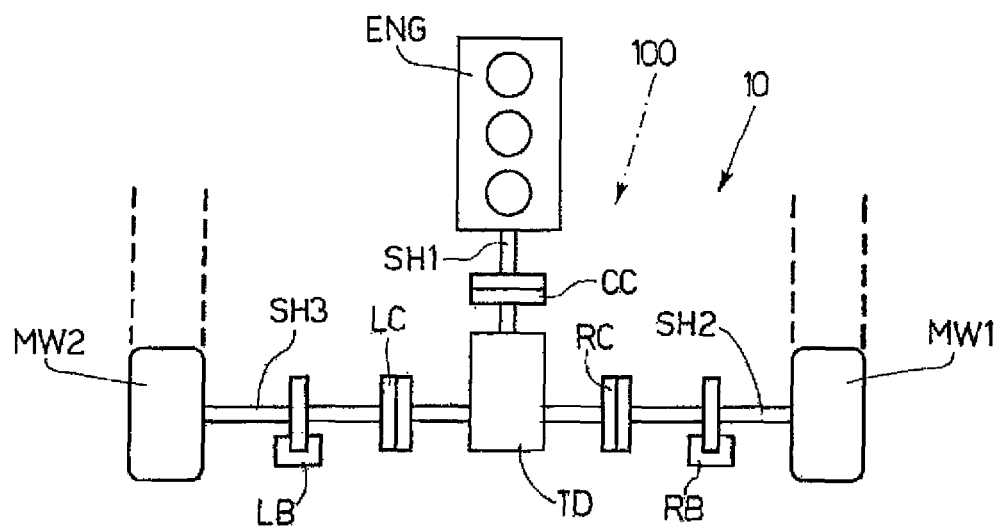
FIG. 1 shows a diagram of the rear portion of a conventional crawler vehicle.

As shown in FIG. 1, the right drive sprocket MW1 is associated with a respective steering clutch RC and a respective brake RB. Similarly, the left drive sprocket MW2 is associated mechanically with a steering clutch LC and a brake LB. To make a wide right turn of crawler vehicle 100, the operator simply releases the corresponding steering clutch RC; whereas, to make a tight right turn, brake RB must also be operated. The same also applies to the left drive sprocket MW2. That is, to make a left turn, the operator acts on steering clutch LC and brake LB, depending on whether a wide or tight turn is required.

Figure 2:
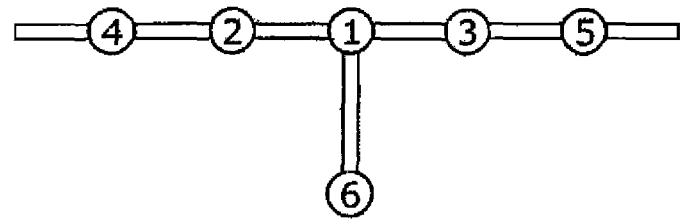
FIG. 2 shows a diagram of the various positions of a control lever of a crawler vehicle.

FIG. 2 shows a diagram of the various positions of a control lever (not shown) of a crawler vehicle (not shown). In position (1), the lever is set to neutral, in which both steering clutches RC and LC and central clutch CC are engaged, and both brakes RB and LB are off.

To make a right (wide) turn of the vehicle, the operator shifts the lever to the right into position (3), in which the right steering clutch RC is released, the left steering clutch LC and central clutch CC remain engaged, and both brakes RB and LB remain off. When the operator shifts the lever further to the right (tight turn) into position (5), the right clutch RC remains released, the right brake RB is activated, the left brake LB is off, and clutches LC and CC are engaged.

Similarly, to make a left (wide) turn of the vehicle, the operator shifts the lever to the left into position (2), in which the left steering clutch LC is released, the right steering clutch RC and central clutch CC remain engaged, and brakes RB and LB remain off. When the operator shifts the lever further to the left (tight turn) into position (4), the left clutch LC remains released, the left brake LB is activated, the right brake RB is off, and clutches RC and CC are engaged.

To release central clutch CC without altering the initial configuration of clutches RC, LC and brakes RB, LB, the operator simply shifts the lever from position (1) to position (6).

Figure 3:
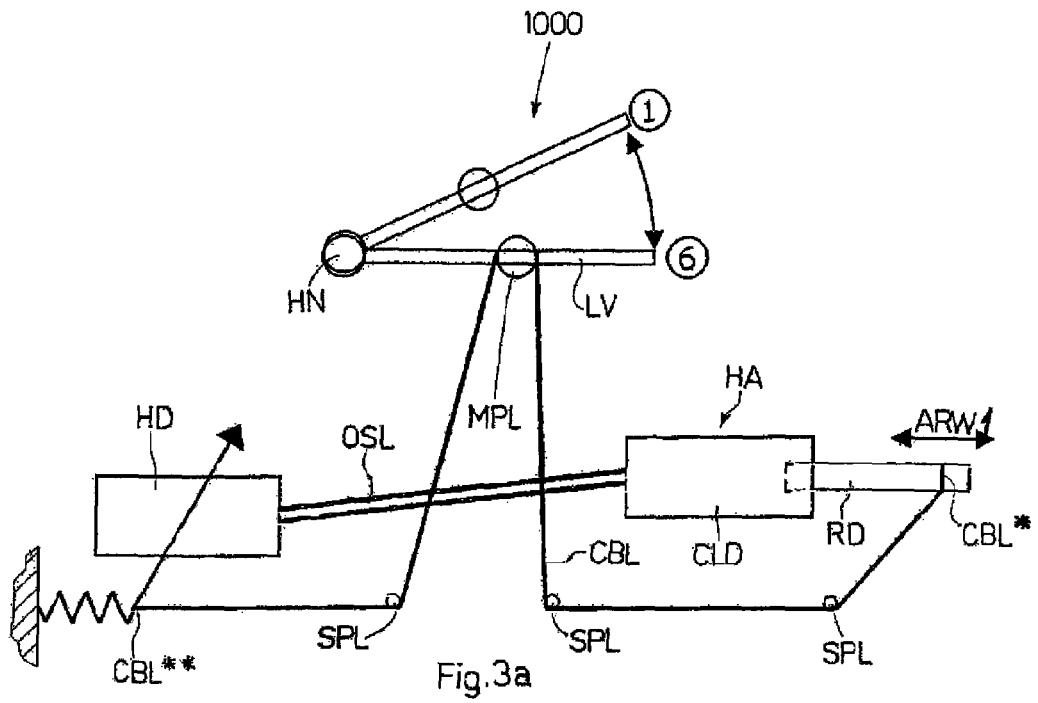
FIGS. 3a, 3b show two different configurations of a first embodiment of a control system in accordance with the present invention.
Figure 3:
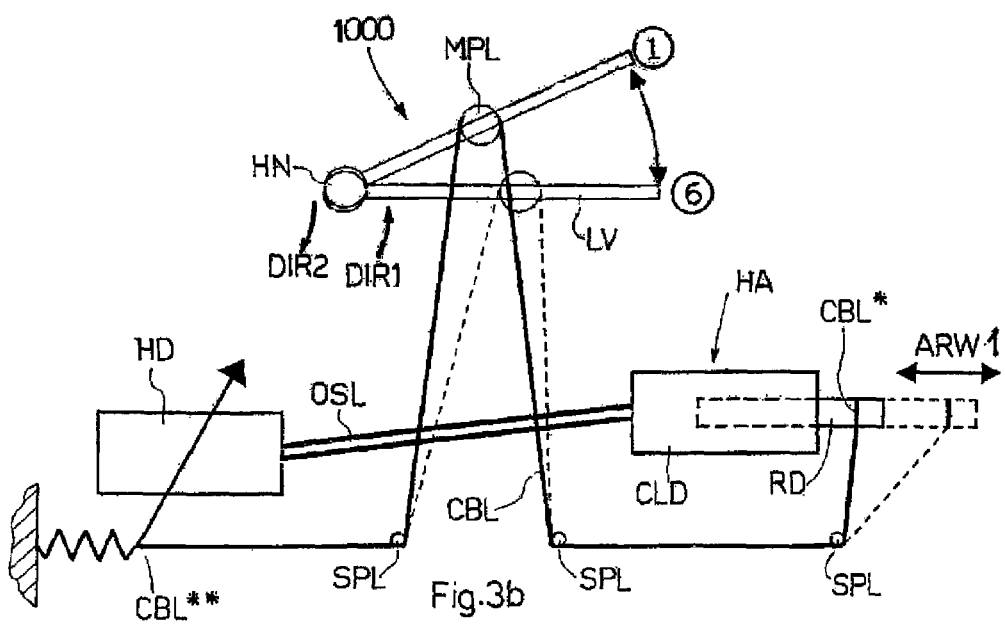

FIGS. 3a and 3b shows a control system 1000 having a lever LV, which pivots about a hinge HN fixed to the vehicle frame and having a return cam (not shown) (see below).

System 1000 also comprises a hydraulic distributor HD for feeding pressurized oil to a hydraulic actuator HA along a feed line OSL. Hydraulic actuator HA provides for engaging/releasing central clutch CC (FIG. 1), and comprises, in known manner, a cylinder CLD with a rod RD which slides in the two directions indicated by two-way arrow ARW1.

System 1000 further has a cable CBL fixed at a first end CBL* to rod RD. A second end CBL** of cable CBL is connected to hydraulic distributor HD to activate/deactivate it, depending on the position of rod RD (see below).

As shown in FIGS. 3a and 3b, system 1000 provides for a feedback function by means of cable CBL, which is wound about a main pulley MPL integral with lever LV, and about three fixed guide pulleys SPL. Cable CBL is substantially non-extensible, and therefore the same length at all times. The various stages in the feedback function will be described as of position (6) shown in FIG. 3b. When lever LV is raised in the direction indicated by arrow DIR1, pull is exerted on cable CBL to open the hydraulic distributor, so that pressurized oil is fed to cylinder CLD of hydraulic actuator HA, and rod RD begins sliding in the rightward direction indicated by arrow ARW1. If the operator at this point releases lever LV, the cam (not shown) at the pivot of lever LV restores lever LV to position (6), thus restoring cylinder CLD to its initial position corresponding to release of central clutch CC. If the operator releases lever LV in any intermediate position between position (1) and position (6), the system automatically restores lever LV to position (6).

Upon lever LV reaching position (1), a stop device (not shown) on the lever holds lever LV in position, and oil feed from hydraulic distributor HD to hydraulic actuator HA is cut off.

If the operator, starting from position (6) (or position (1)), sets and holds lever LV in any position between the two limit positions (1) and (6), this sets the system to a controlled-skating or "creeping" position, the idea being to control the position set by cable CBL.

If the lever is set to any position (X) (not shown), distributor HD is activated when shifting lever LV from position (6) to position (X), thus activating hydraulic actuator HA. And, if the operator stops in and maintains position (X), cable CBL provides for establishing a controlled-skating position. The lever may be set theoretically to any number of balanced controlled positions (X) between positions (1) and (6) to "skate" as desired by the operator. This is a vital function when making small movements of the vehicle (e.g. to attach implements).

If the system is in position (1) and lever LV is simply disengaged from position (1) and released, it is automatically set to position (6). This is obviously only theoretical, in that, in actual use, the lever will be controlled by the operator to shift smoothly.

Figure 4:
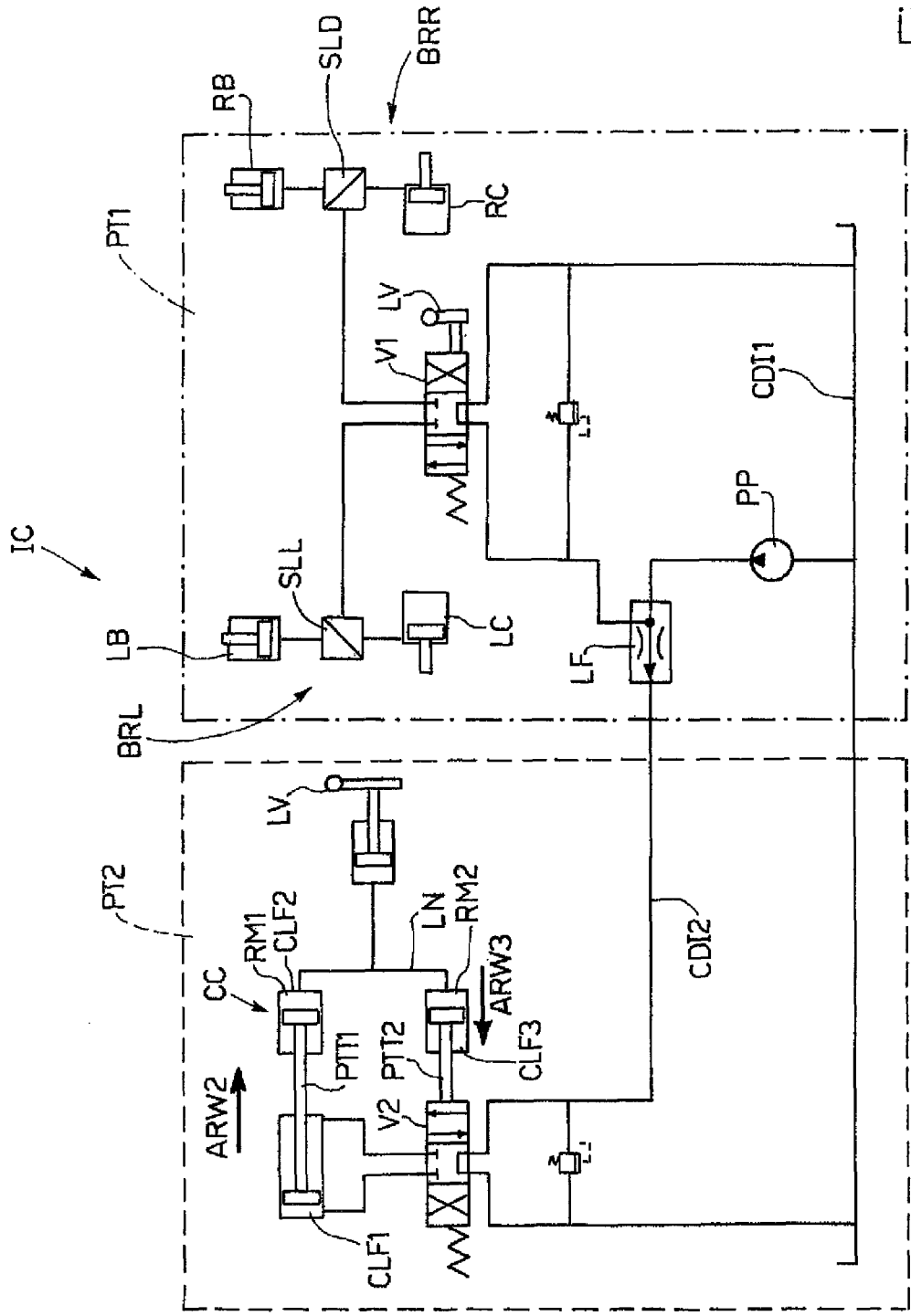
FIG. 4 shows a second embodiment of a control system in accordance with the present invention.

FIG. 4 shows a hydraulic circuit IC implementing a second embodiment of the present invention.

Hydraulic circuit IC comprises a conventional first portion PT1; and a second portion PT2 actually implementing the present invention.

First portion PT1 comprises a first hydraulic feed circuit CDI1 with a pump PP for supplying a triple-slide valve V1 activated by lever LV as described above.

Depending on the slide settings of valve V1, pressurized oil is fed along a right branch BRR or a left branch BRL. When oil is fed along the right branch BRR, clutch RC may be released and/or brake RB activated, depending on the setting of a selector SLD which determines the type of braking to be performed (see above). Similarly, when oil is fed along the left branch BRL, clutch LC may be released and/or brake LB activated, depending on the setting of a selector SLL which determines the type of braking to be performed (see above).

First portion PT1 of hydraulic circuit IC is connected hydraulically to second portion PT2 via a flow regulating valve LF fitted along a second hydraulic feed circuit CDI2. Second portion PT2 also comprises a triple-slide valve V2 activated by the same lever LV as for first portion PT1.

Though FIG. 4 shows two separate levers LV for the sake of simplicity, they are actually the same lever LV described with reference to FIGS. 3a and 3b. Depending on the slide settings of valve V2, pressurized oil is fed to a hydraulic cylinder CLF1 having a double-acting piston PTT1, which moves in the direction of arrow ARW2 and forms part of an actuator of central clutch CC. The oil inside a chamber RM1 of a hydraulic cylinder CLF2 is compressed by piston PTT1 and forced along a line LN into a chamber RM2 of a hydraulic cylinder CLF3, thus moving a piston PTT2, integral with the slides of valve V2, in the direction of arrow ARW3 to reset the slides of valves V2. The feedback function described relative to the first embodiment in FIGS. 3a and 3b is thus performed hydraulically.

The control system has the several advantages. One lever LV provides for controlled-position controlling steering clutches RC, LC, brakes RB, LB, and central clutch CC. As soon as it is disengaged from position (1), lever LV is moved automatically into position (6) to release central clutch CC. Similarly, if released by the operator in any position between positions (1) and (6), lever LV is moved automatically into position (6). If the operator holds lever LV firmly in any position between positions (1) and (6), the position is operator-controlled as required to "skate" and permit intricate manoeuvring of the vehicle.

We claim:

1. A drive control system for a crawler vehicle, the system comprising:

a lever pivoting about a hinge fixed to a frame of the vehicle;

hydraulic distributor activated by said lever as of an initial position; said hydraulic distributor configured to supply pressurized oil over a feed line to a hydraulic actuator; and said hydraulic actuator configured to engage and release a central clutch;

a hydraulic feedback for restoring said hydraulic distributor to said initial position; the hydraulic feedback comprising a triple-slide valve activated by the lever, wherein depending on the slide settings of the valve, pressurized oil is fed to a first hydraulic cylinder having a double-acting piston that moves in a given direction; the piston forming part of an actuator of the central clutch; and the oil in a first chamber of a second hydraulic cylinder is compressed by the piston and forced along a line into a second chamber of a third hydraulic cylinder, and the incoming pressurized oil to the second chamber moves a piston, integral with the slides of the valve, in a given direction to reset the slides of the valve to the initial position.

2. A method of feedback controlling drive of a crawler vehicle, the method comprising the following steps:

activating a triple-slide valve by a lever; such that depending on the slide settings of the valve, pressurized oil is fed to a first hydraulic cylinder having a double-acting piston that moves in a given direction ; wherein the piston forms part of an actuator of a central clutch;

compressing by a piston the oil in a first chamber of a second hydraulic cylinder and forcing the oil along a line into a second chamber of a third hydraulic cylinder;

moving a piston, with the incoming pressurized oil to the second chamber, integral with the slides of the valve, in a given direction to reset the slides of the valve to the initial position.

* * * * *